US009124348B2

(12) United States Patent
Kimura et al.

(10) Patent No.: US 9,124,348 B2
(45) Date of Patent: Sep. 1, 2015

(54) MOBILE TERMINAL HAVING A MICROPHONE SOUND HOLE AND SPEAKER SOUND HOLE DISPOSED ON THE SAME PLANE

(75) Inventors: Ryosuke Kimura, Kanagawa (JP); Masato Shigemura, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 192 days.

(21) Appl. No.: 14/005,513

(22) PCT Filed: Mar. 16, 2012

(86) PCT No.: PCT/JP2012/001854
§ 371 (c)(1),
(2), (4) Date: Sep. 16, 2013

(87) PCT Pub. No.: WO2012/124348
PCT Pub. Date: Sep. 20, 2012

(65) Prior Publication Data
US 2014/0004913 A1    Jan. 2, 2014

(30) Foreign Application Priority Data
Mar. 17, 2011 (JP) ................... 2011-059390

(51) Int. Cl.
*H04M 1/00* (2006.01)
*H04B 1/3827* (2015.01)
*H04M 1/03* (2006.01)

(52) U.S. Cl.
CPC ............. *H04B 1/3833* (2013.01); *H04M 1/035* (2013.01)

(58) Field of Classification Search
CPC ............................. H04M 1/035; H04B 1/3833
USPC ............................................ 455/575.1, 575.4
See application file for complete search history.

(56) References Cited

U.S. PATENT DOCUMENTS

| 6,355,890 B1 * | 3/2002 | Kuroda .................... 200/5 A |
| 6,680,676 B1 * | 1/2004 | Hayashi et al. ............. 341/22 |
| 8,078,239 B2 * | 12/2011 | Numano et al. .......... 455/575.4 |

FOREIGN PATENT DOCUMENTS

| CN | 1290099 | 4/2001 |
| GB | 2 357 212 | 6/2001 |

(Continued)

OTHER PUBLICATIONS

International Search Report dated May 29, 2012.
(Continued)

*Primary Examiner* — Amancio Gonzalez
(74) *Attorney, Agent, or Firm* — Dickinson Wright PLLC

(57) ABSTRACT

The purpose of the present invention is to provide a mobile terminal device that: suppresses the generation of echoes and howling that cause a deterioration in call quality; and achieves good call performance. The mobile terminal device (100) comprises a rear surface casing (120) and a battery cover (130) that covers the entire rear surface of the rear surface casing (120). Sound holes (125) for a microphone (170) and speaker sound holes (124) for a speaker (150) are arranged on the same rear surface of the rear surface casing (120). The rear surface casing (120) comprises a concave groove section (129), at least on the speaker (150) side and around the sound holes (125) for the microphone (170). The battery cover (130) comprises a convex protruding section (139) that fits into the groove section (129).

10 Claims, 18 Drawing Sheets

(56) References Cited

FOREIGN PATENT DOCUMENTS

| | | |
|---|---|---|
| JP | 2001-61530 | 3/2001 |
| JP | 2001-103146 | 4/2001 |
| JP | 2005-159869 | 6/2005 |
| JP | 2006-135889 | 5/2006 |

OTHER PUBLICATIONS

English translation of Informal Comments for PCT/JP2012/001854.

* cited by examiner

MOBILE TERMINAL HAVING A MICROPHONE SOUND HOLE AND SPEAKER SOUND HOLE DISPOSED ON THE SAME PLANE

TECHNICAL FIELD

The present invention relates to a portable terminal apparatus such as a mobile telephone handset having a microphone sound hole and speaker sound hole disposed on the same plane.

BACKGROUND ART

A mobile terminal apparatus such as a mobile telephone has a microphone buried into a casing. For example, a mobile telephone handset used by sliding the display section casing with respect to the operation section casing has a microphone sound hole disposed on the bottom surface of the operation section casing. For this reason, if a call is made with the main unit in the retracted state, the voice of the other party coming from the speaker travels around the upper part of the display section casing and enters into the gap between the display section casing and the operation section casing. The voice of the other party that enters the gap, by being reflected between the two casings, easily enters the microphone, resulting in a phenomenon whereby the other party can hear his or her own voice (hereinafter referred to as an echo).

When coupling of sound or vibration occurs between the speaker and the microphone, an echo occurs whereby the voice of the other party returns to his or her own ear.

Patent Literature 1 describes a mobile telephone handset in which the display section casing can be slid with respect to the operation section casing. The mobile telephone handset described in Patent Literature 1 is provided with a protrusion in the display section casing direction in the periphery of the microphone installed in the operation section casing. In addition, the mobile telephone handset is provided with a protruding section in the operation section casing direction in the display section casing part opposing the protruding section of the above-noted operation section casing when the slide in the collapsed condition. With this configuration, a wall is formed around the microphone by the two opposing protrusions, which suppresses the occurrence of echoes during a call.

CITATION LIST

Patent Literature

PTL 1
Japanese Patent Application Laid-Open No. 2006-135889

SUMMARY OF INVENTION

Technical Problem

However, in an apparatus in which a microphone is buried in a casing, the following problems exist.

The mobile telephone handset described in Patent Literature 1 has a shape that is seen in a terminal having a camera function. In a terminal with such a bar shape, if the sound-emitting direction of the speaker and the sound-collecting direction of the microphone are in the same direction, the travelling of sound through the main path of the space between the casing section and the battery cover section causes the problems of a tendency for echoes and howling to occur, which in turn reduces the call quality.

The mobile telephone handset described in Patent Literature 1, although it has the effect of suppressing echoes under specific conditions, it has the problem of little effect in the case in which sound enters from another direction or there is signal transmission by casing vibration. The above-noted specific conditions refer to effectiveness in the case of a configuration with respect to a terminal having a sliding construction, and when sound enters from only a specific direction.

Additionally, in the mobile telephone handset described in Patent Literature 1, because a protrusion is disposed in a part of frequent sliding by a user operation, there is the problem of deteriorated performance caused by wear.

An object of the present invention is to provide a mobile terminal apparatus suppressing echoes and howling that deteriorate call quality and thereby achieving good call performance.

Solution to Problem

A mobile terminal apparatus according to an aspect of the present invention includes: a casing; and a battery cover that covers a rear surface of the casing, in which: the rear surface of the casing includes a microphone sound hole and a speaker sound hole that are disposed on the same plane; and there is a gap between the rear surface of the casing and the battery cover, in which: the casing includes a recessed section between the microphone sound hole and the speaker sound hole; and the battery cover includes a protruding section that mates with the recessed section and that thus covers the gap.

Advantageous Effects of Invention

The present invention can achieve a mobile terminal apparatus that can suppress the occurrence of echoes and howling which cause a deterioration of the call quality and that is capable of good call performance.

DESCRIPTION OF EMBODIMENTS

Embodiments of the present invention will be described in detail with reference to the accompanying drawings.

(Embodiment 1)

Figure 1:
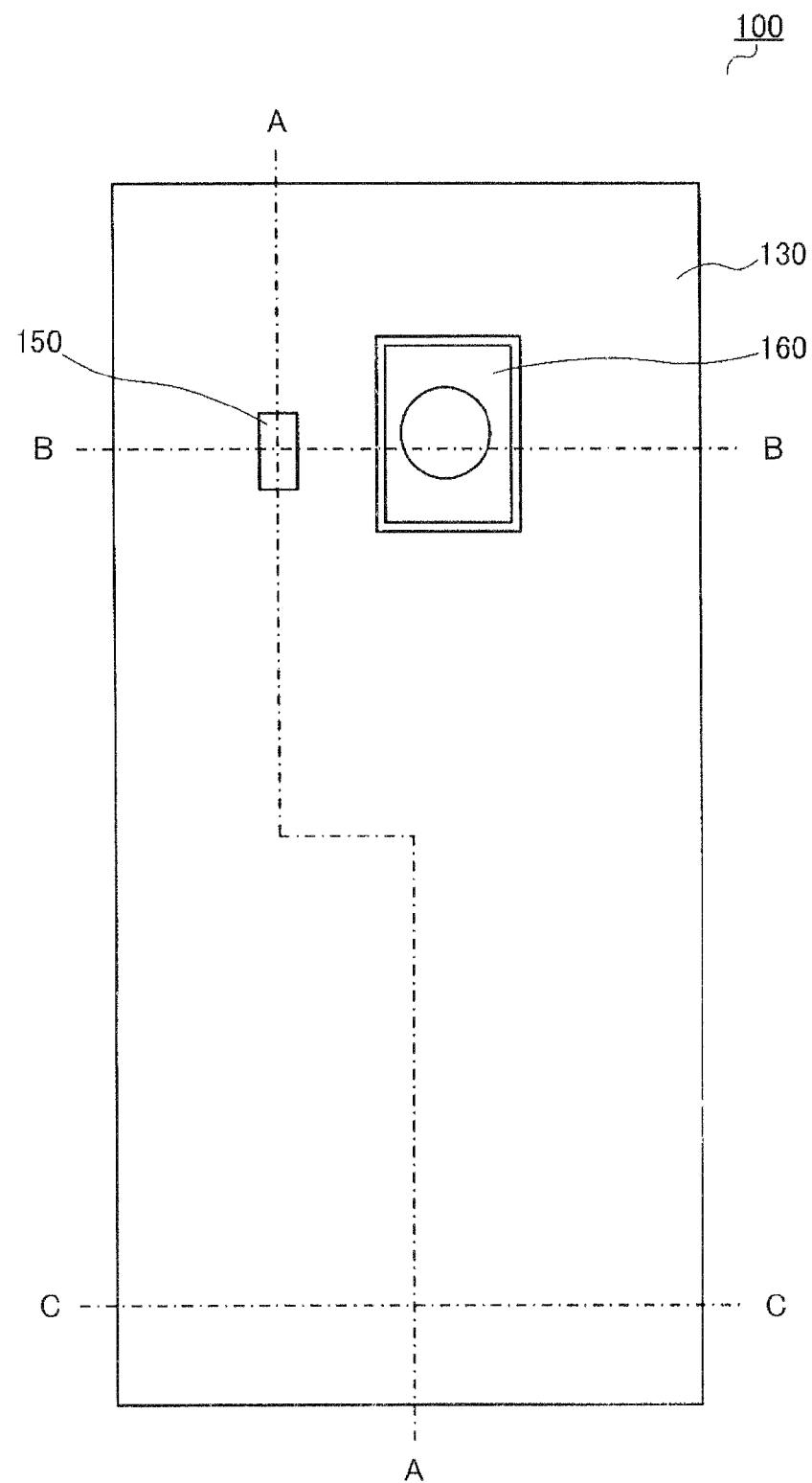
FIG. 1 is a rear view showing the condition in which the battery cover of the mobile terminal apparatus of Embodiment 1 of the present invention is mounted.
Figure 2:
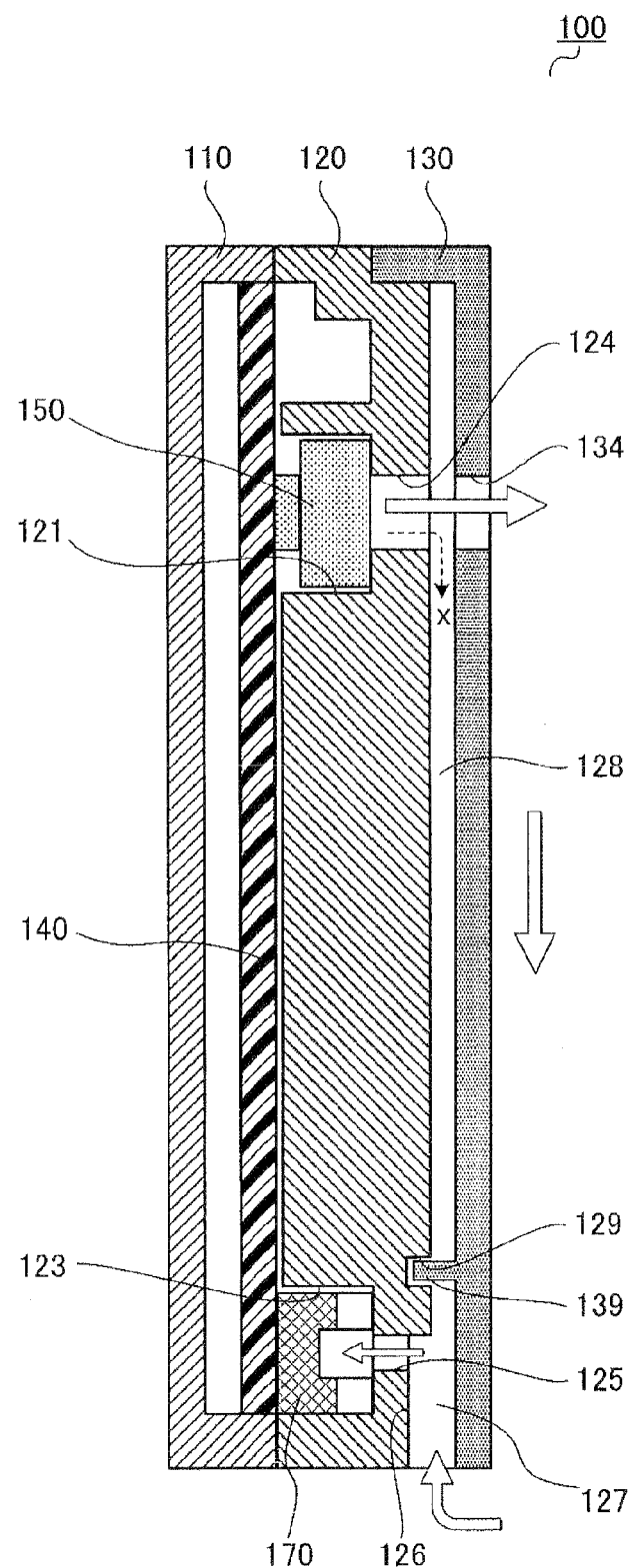
FIG. 2 is a cross-sectional view showing the general configuration of an electronic apparatus along the line A-A in FIG. 1.
Figure 3:
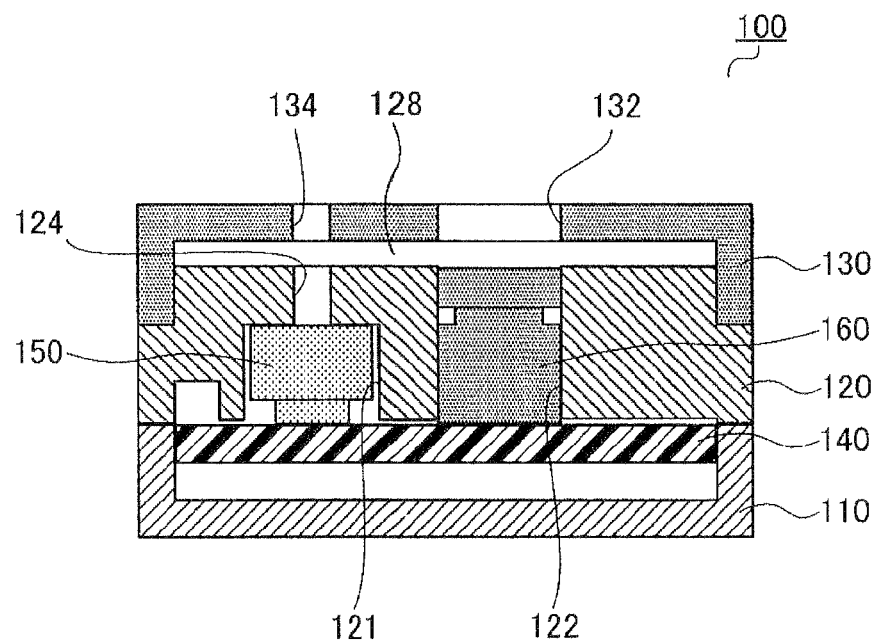
FIG. 3 is the B-B cross-sectional view indicated in FIG. 1.
Figure 4:
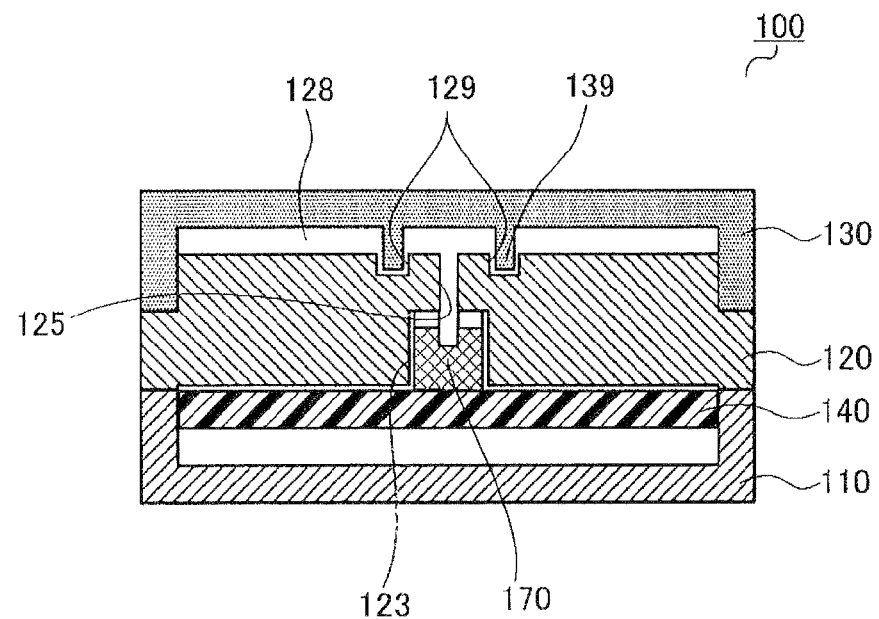
FIG. 4 is the C-C cross-sectional view indicated in FIG. 1.

FIG. 1 is a rear view showing the condition in which the battery cover of the mobile terminal apparatus according to Embodiment 1 of the present invention is mounted. FIG. 2 is the A-A cross-sectional view indicated in FIG. 1, FIG. 3 is the B-B cross-sectional view indicated in FIG. 1, and FIG. 4 is the C-C cross-sectional view indicated in FIG. 1. In the following, a mobile terminal apparatus according to the present invention is realized using a mobile telephone handset or PHS (Personal Handy-Phone System) mobile communication terminal having a camera. Application can also be made to a mobile data apparatus such as a PDA (personal digital assistant).

As shown in FIG. 1 to FIG. 4, mobile terminal apparatus 100 has front surface casing 110, rear surface casing 120, battery cover 130, printed circuit board 140, speaker 150, camera 160, and microphone 170.

In mobile terminal apparatus 100, with regard to the cover part for covering the battery part, battery cover 130 has a shape that covers the entire rear surface casing 120. This shape can enhance the designability of mobile terminal apparatus 100.

As shown in FIG. 1, in mobile terminal apparatus 100, battery cover 130 is mounted to rear surface casing 120, and rear surface casing 120 is not exposed.

Speaker 150 is disposed slightly to the left of the center on the top part of rear surface casing 120, and camera 160 is disposed next to it on the right. Speaker 150 includes a loudspeaker arrangement for hands-free calling, and is not restricted to use as a receiver brought up against the ear for use.

Camera 160 is disposed at a position in which the hand will not block the camera if the user uses mobile terminal apparatus 100 as a camera.

As shown in FIG. 2 to FIG. 4, printed circuit board 140 is housed inside front surface casing 110. Speaker 150, camera 160, and microphone 170 are mounted to printed circuit board 140. Microphone 170 is disposed at the position of the mouth during hand-held use. If microphone 170 is disposed on the same plane as speaker 150 so as to accommodate hands-free calling, it is not restricted to the above-noted arrangement.

Aperture section 121 housing speaker 150 mounted to printed circuit board 140, aperture section 122 housing camera 160, and aperture section 123 housing microphone 170 are formed in rear surface casing 120. Aperture sections 121, 122, and 123 have shapes that are substantially the same as the outer shapes of the corresponding components formed on the rear surface of rear surface casing 120, so that each of the components is housed therein without a gap.

Speaker sound hole 124 for speaker 150, which is in communication with speaker 150, and which opens toward battery cover 130 side, is formed in rear surface casing 120. Speaker sound hole 124, as shown in FIG. 1, is a rectangle which is long in the long direction of mobile terminal apparatus 100.

Sound hole 125 for microphone 170 is formed in rear surface casing 120. The bottom part of rear surface casing 120 has formed therein aperture section 126, directed toward the base surface. For this reason, gap 127 is formed between the lower part surface of rear surface casing 120 and the rear surface of battery cover 130, and gap 127 serves as a sound collection path from the base part of mobile terminal apparatus 100 to gap 127, and up to sound hole 125 and microphone 170.

Aperture section 132 having substantially the same shape as aperture section 122 housing camera 160 of rear surface casing 120 is formed in battery cover 130. Aperture section 132 has a position, shape, and size corresponding to aperture section 122.

Battery cover sound hole 134 is formed on battery cover 130 in communication with speaker sound hole 124 of rear surface casing 120, and battery cover sound hole 134 has a position, shape, and size corresponding to rear surface casing 120.

In this manner, mobile terminal apparatus 100 has a configuration in which battery cover 130 covers rear surface casing 120 entirely, and speaker sound hole 124 of speaker 150 housed in rear surface casing 120 and microphone sound hole 125 of microphone 170 are disposed so that they are in the same direction. That is, in mobile terminal apparatus 100, the sound emitting-direction of speaker 150 and the sound-collection direction of microphone 170 are set in the same direction.

Space 128 is formed between rear surface casing 120 and battery cover 130. When battery cover 130 covers the entire rear surface casing 120, space 128 becomes necessary because of the inconsistency in heights and housing space for the battery and various components, and the need to have leeway in opening and closing.

The features of the present embodiment with the above-noted configuration are as follows.

Recessed groove section 129 is formed in the periphery of microphone sound hole 125 of rear surface casing 120. Protruding section 139 with which groove section 129 mates is formed in battery cover 130 at a position facing groove section 129.

That is, mobile terminal apparatus 100 according to the present embodiment has the features of recessed groove section 129 of being formed in the periphery of microphone sound hole 125 of rear surface casing 120 and protruding section 139 with which groove section 129 mates being formed in battery cover 130.

In the present embodiment, groove section 129 is formed so that the base section of rear surface casing 120 is open and the periphery of microphone sound hole 125 is surrounded by a channel shape like a right square bracket. In the same manner, protruding section 139 that mates with groove section 129 is shaped as a channel like a right square bracket so as to mate with groove section 129. Groove section 129 and protruding section 139 are formed on at least one side on speaker 150 side.

Groove section 129 and protruding section 139 are configured to form an upright wall by the mating of the protruding and recessed shapes.

Groove section 129 and protruding section 139 are provided at a location that is approximately 1 mm from the periphery of microphone sound hole 125. It is desirable that the depth of groove section 129 be 0.8 to 0.9 mm and that the width thereof be 0.4 to 0.7 mm.

The transmitting and receiving operation of mobile terminal apparatus 100 configured as noted above is described below.

The white arrows in FIG. 2 show the echo path over which sound propagates outside battery cover 130. The broken line arrow in FIG. 2 shows the echo path in the case of sound propagating inside battery cover 130.

[Echo Path of Sound Propagating Outside Battery Cover 130]

As shown by the white arrows in FIG. 2, the voice of the other party generated from speaker 150 passes through speaker sound hole 124 of rear surface casing 120 and battery cover sound hole 134 of battery covet 130, traveling around the outside of battery cover 130 and entering, from the base section of battery cover 130 into gap 127 between rear surface casing 120 and battery cover 130. The voice of the other party then further passes through sound hole 125 of microphone 170 of rear surface casing 120 and is picked up by microphone 170.

In this case, the sound that is to be reduced is sound in the audible band (20 Hz to 20 kHz), including the call frequency band (300 Hz to 3.4 kHz).

[Echo Path of Sound Propagating Inside Battery Cover 130]

As shown by the broken line arrow in FIG. 2, when a voice generated from speaker 150 passes through space 128 between rear surface casing 120 and battery cover 130, passes through sound hole 125 of microphone 170, and is picked up by microphone 170, echoes and howling that cause a deterioration of the call quality lend to occur.

In the present embodiment, by the forming of recessed groove section 129 in the periphery of microphone sound hole 125 of rear surface casing 120 and also providing in battery cover 130 protruding section 139 that mates with groove section 129, sound passing through space 128 between rear surface casing 120 and battery cover 130 is attenuated. By doing this, it is possible to reduce echoes in the case of propagation from speaker 150 to microphone 170 inside battery cover 130, thereby suppressing the occurrence of echoes during a call.

As described in detail above, mobile terminal apparatus 100 has rear surface casing 120 and battery cover 130 that covers the entire rear surface of rear surface casing 120, and on the rear surface of rear surface casing 120, has sound hole 125 of microphone 170 and speaker sound hole 124 of speaker 150 arranged on the same plane. Rear surface casing 120 has at least on the side of speaker 150 in the periphery of sound hole 125 of microphone 170, recessed groove section 129, and battery cover 130 has protruding section 139 that mates with groove section 129.

According to this configuration, because groove section 129 formed in the periphery of microphone 125 and protruding section 139 reduce sound propagating through space 128 from speaker 150 to microphone 170 inside battery cover 130, it is possible to suppress echoes and howling during a call. For the same reason, with respect to coupling by vibration so as to propagate through battery cover 130, the amount of displacement of battery cover 130 can be attenuated.

In addition to the above-noted effect of suppressing echoes and howling, there is the following effect.

In the present embodiment, because groove section 129 formed in the periphery of microphone sound hole 125 and protruding section 139 suppress echoes and howling, it is possible to reduce echo and howling countermeasures such as for example, providing thickness in rear surface casing 120 itself, thereby enabling a contribution to achieving a slim terminal. Echo and howling countermeasures of rear surface case 120 itself are, for example, forming the roof part of microphone sound hole 125 by rear surface casing 120. In the case in which the roof part of microphone sound hole 125 is formed by battery cover 130, it is possible to make the terminal slimmer by the amount of the thickness of the roof formed by rear surface casing 120.

In the present embodiment, because there is no increase in the number of constituent components, a cost reduction is possible, and there is the advantage of easy implementation.

Additionally, because there is no change in the shape of rear surface casing 120 and battery cover 130 in the area surrounding speaker 150, there is the advantage that there is no design change in these parts.

(Embodiment 2)

Figure 5:
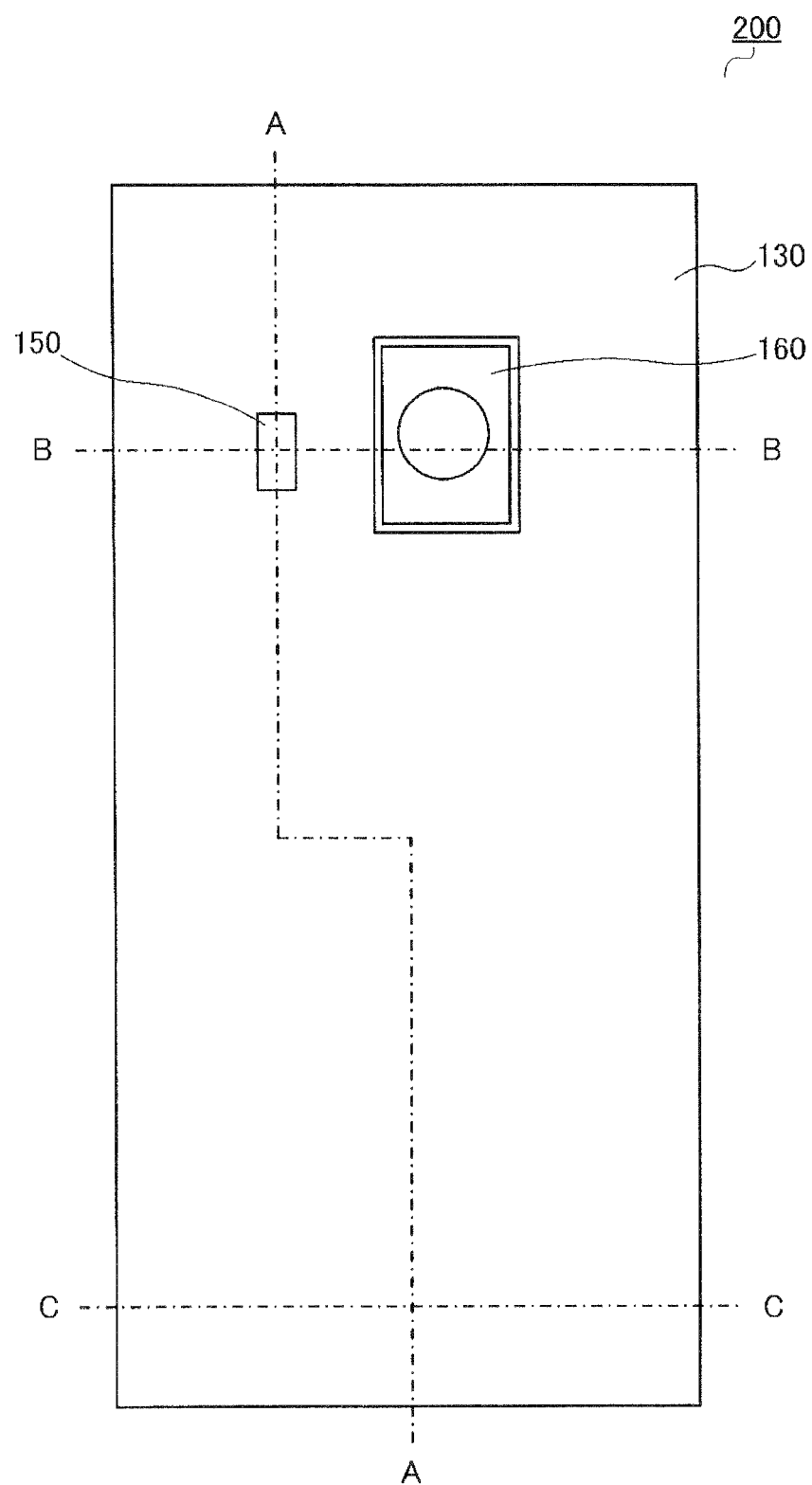
FIG. 5 is a rear view showing the condition in which the battery cover of the mobile terminal apparatus of Embodiment 2 of the present invention is mounted.
Figure 6:
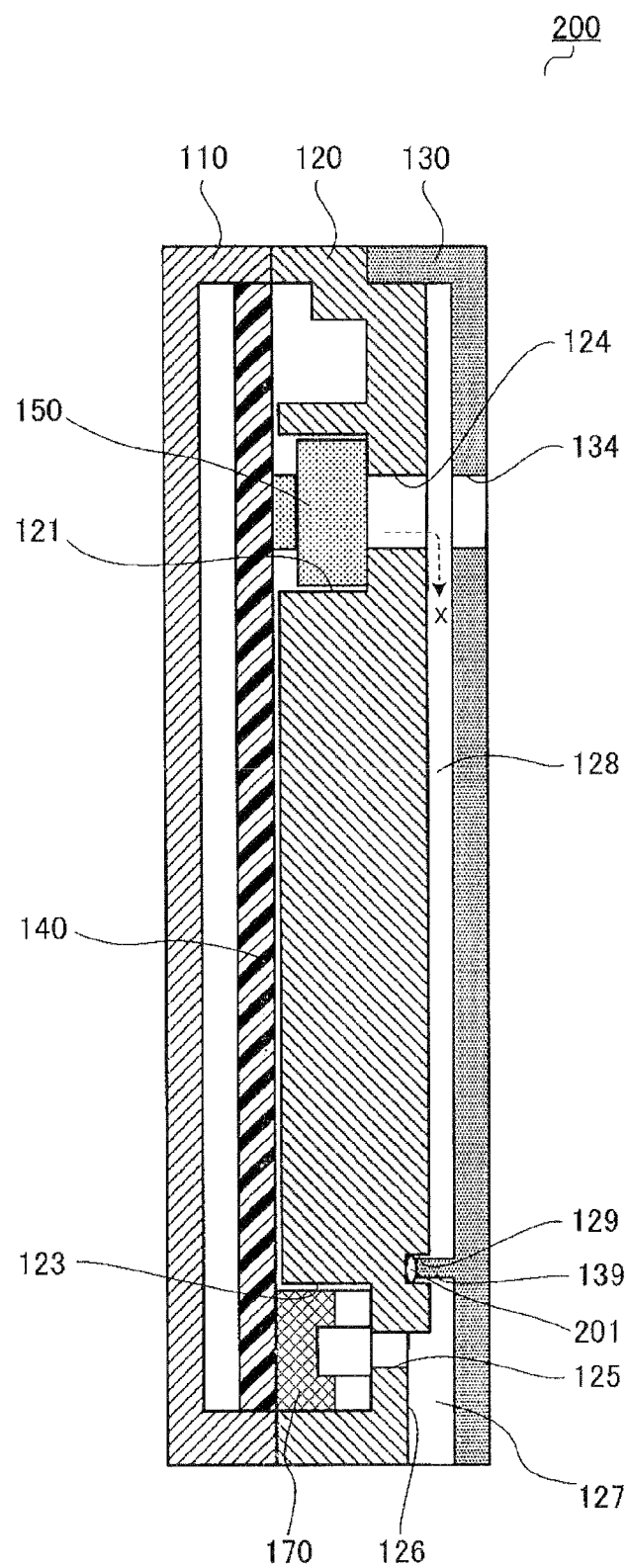
FIG. 6 is a cross-sectional view showing the general configuration of an electronic apparatus having the A-A cross-section indicated in FIG. 5.
Figure 7:
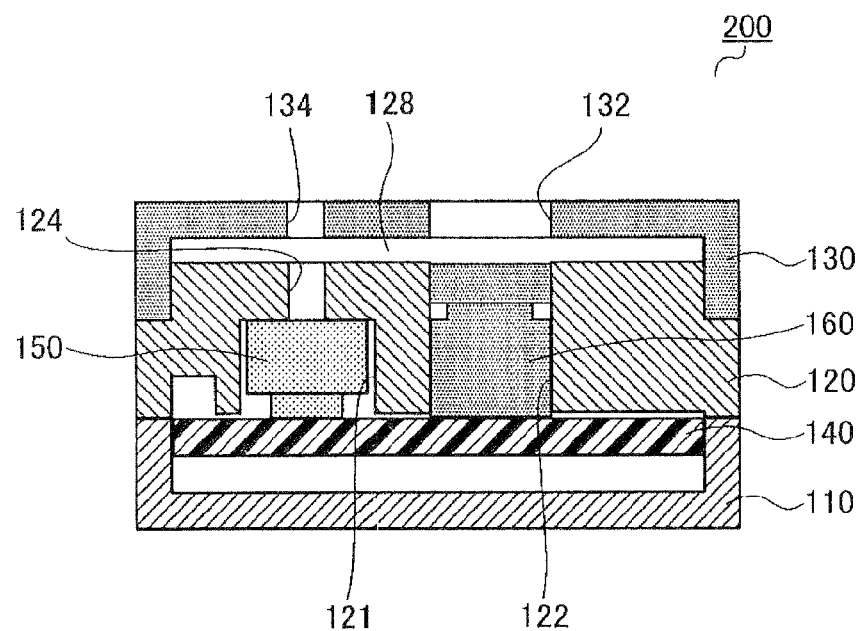
FIG. 7 is the B-B cross-sectional view indicated in FIG. 5.
Figure 8:
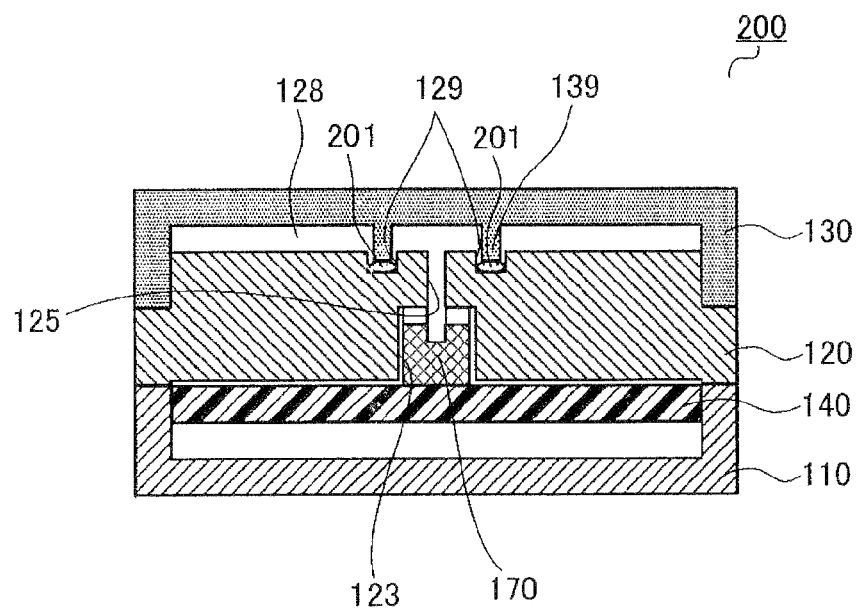
FIG. 8 is the C-C cross-sectional view indicated in FIG. 5.

FIG. 5 is a rear view showing the condition in which the battery cover of a mobile terminal apparatus according to Embodiment 2 of the present invention is mounted. FIG. 6 is the A-A cross-sectional view indicated in FIG. 5, FIG. 7 is the B-B cross-sectional view indicated in FIG. 5, and FIG. 8 is the C-C cross-sectional view indicated in FIG. 5. In describing the present embodiment, constituent parts that are the same as ones in FIG. 1 to FIG. 4 are assigned the sane reference symbols and repeated descriptions thereof will be omitted.

As shown in FIG. 5 to FIG. 8, mobile terminal apparatus 200 has groove section 129 formed in the periphery of microphone sound hole 125 of rear surface casing 120, protruding section 139 formed in battery ease 130 and mating with groove section 129, and elastic body 201 fit by insertion with groove section 129 and pressed by protruding section 139.

Elastic body 201 is installed by attachment to the base part groove section 129. A polyurethane-based or polyolefin-based foam-based body, or a rubber-based material such as silicone rubber or elastomer resin can be used as the material for elastic body 201.

In this manner, in the present embodiment, by mobile terminal apparatus 200 adopting a configuration in which, in mobile terminal apparatus 200, elastic body 201 is fitted by insertion into groove section 129 of rear surface casing 120 and is pressed from above by protruding section 139 of battery cover 130, elastic body 201 absorbs echoes and howling, enabling further improvement of the echo suppression effect.

Elastic body 201 is installed by attachment to the base part of groove section 129, and the assembly accuracy required during the installation is relatively low. As a result, the attachment of elastic body 201 is facilitated, this being a manufacturing advantage by improving the ease of working. Because the position of attachment of elastic body 201 is not a position that is slid repeatedly by an operation by the user, it is difficult for deterioration by wear to occur.

(Embodiment 3)

Figure 9:
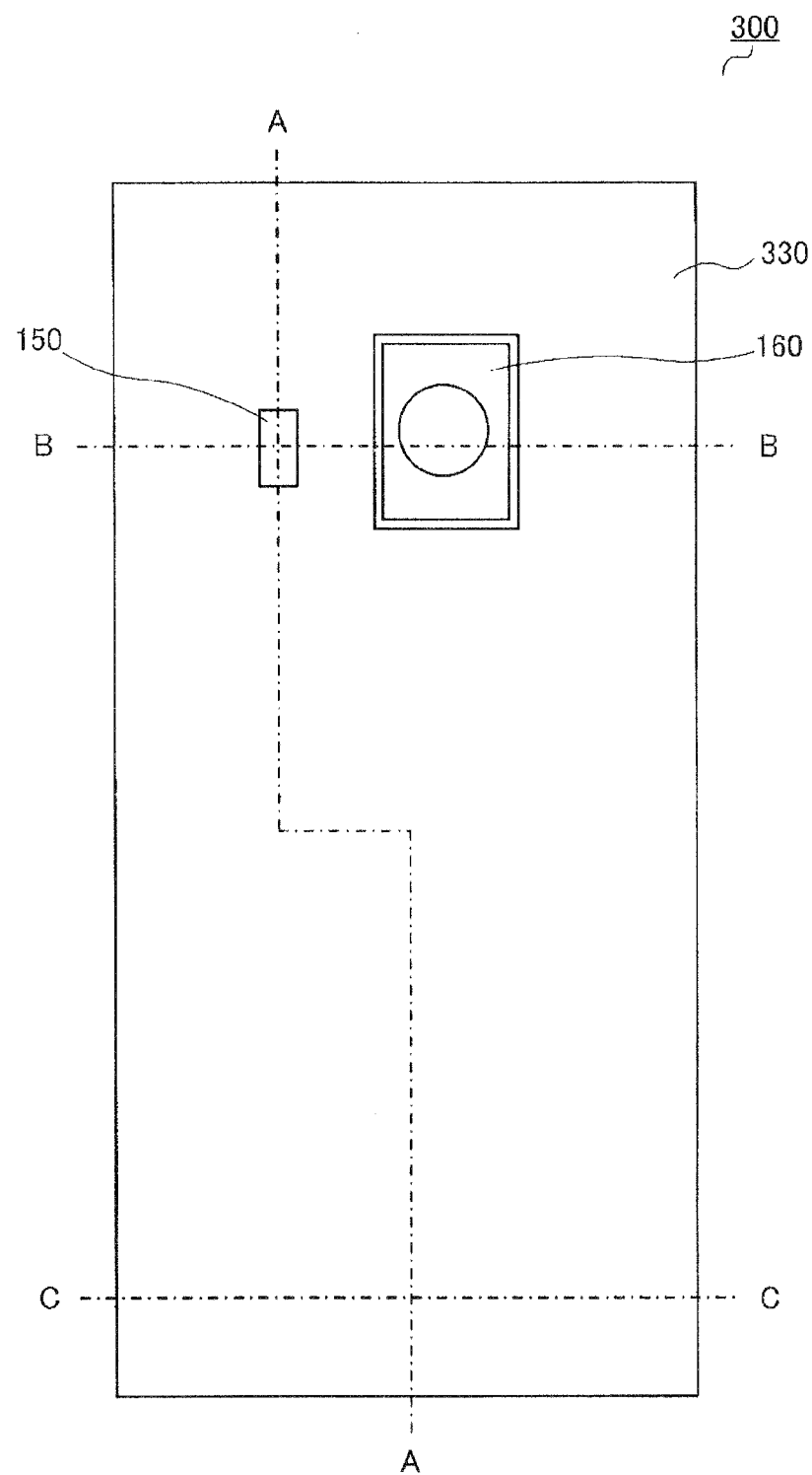
FIG. 9 is a rear view showing the condition in which the battery cover of the mobile terminal apparatus of Embodiment 3 of the present invention is mounted.
Figure 10:
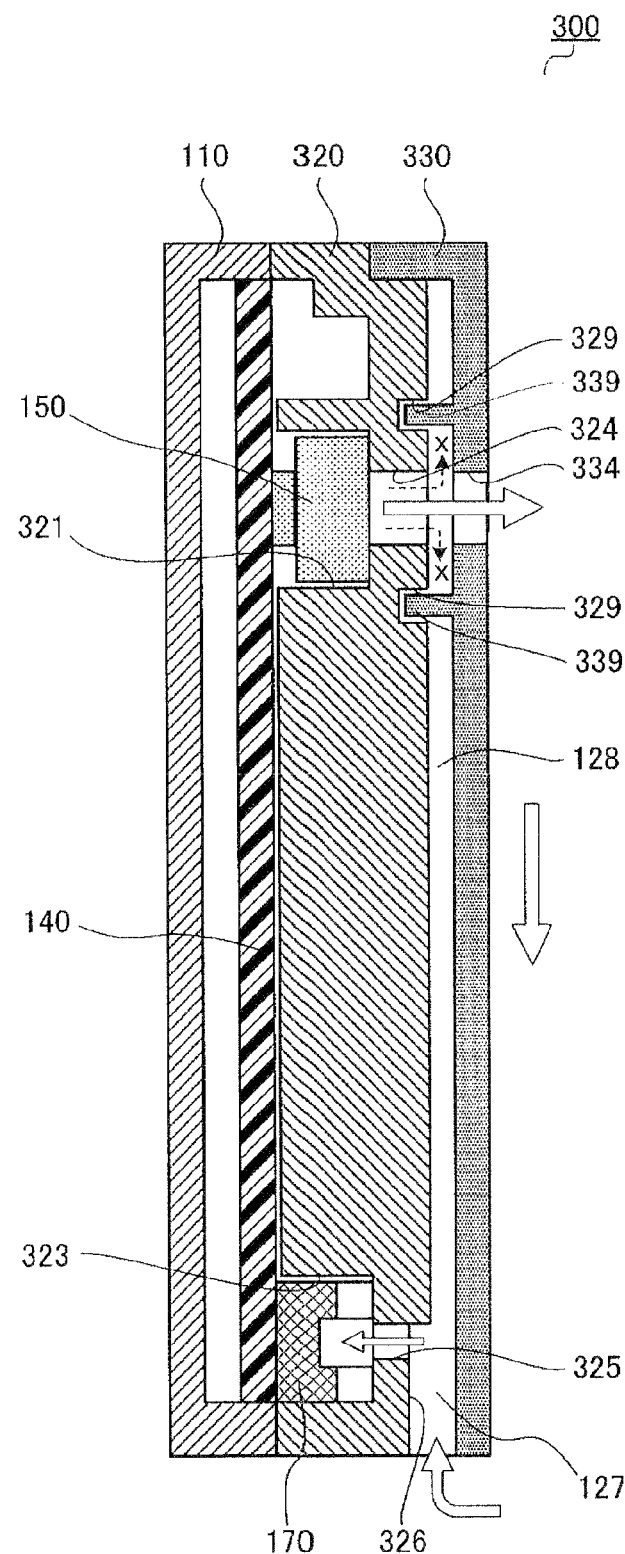
FIG. 10 is a cross-sectional view showing the general configuration of an electronic apparatus having the A-A cross-section indicated in FIG. 9.
Figure 11:
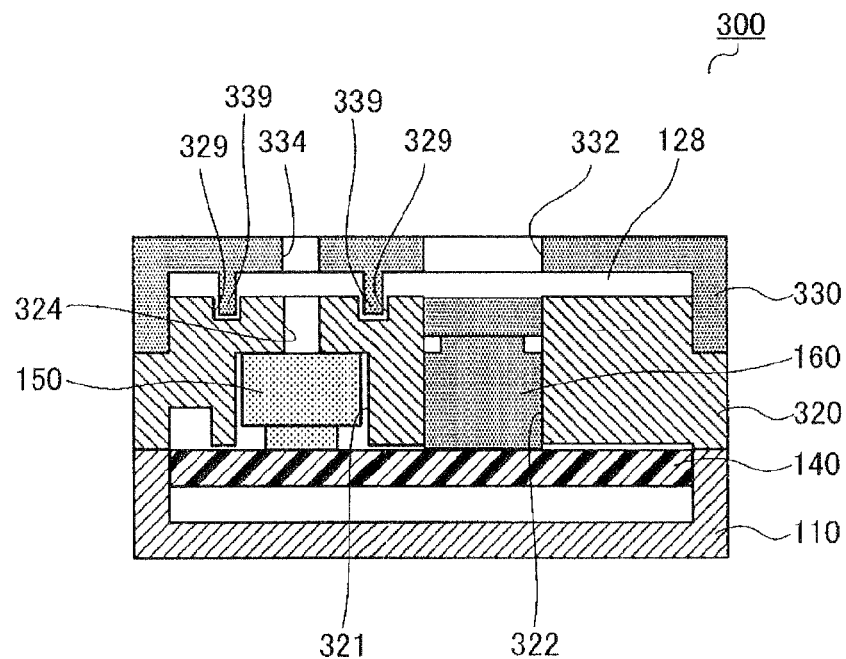
FIG. 11 is the B-B cross-sectional view indicated in FIG. 9.
Figure 12:
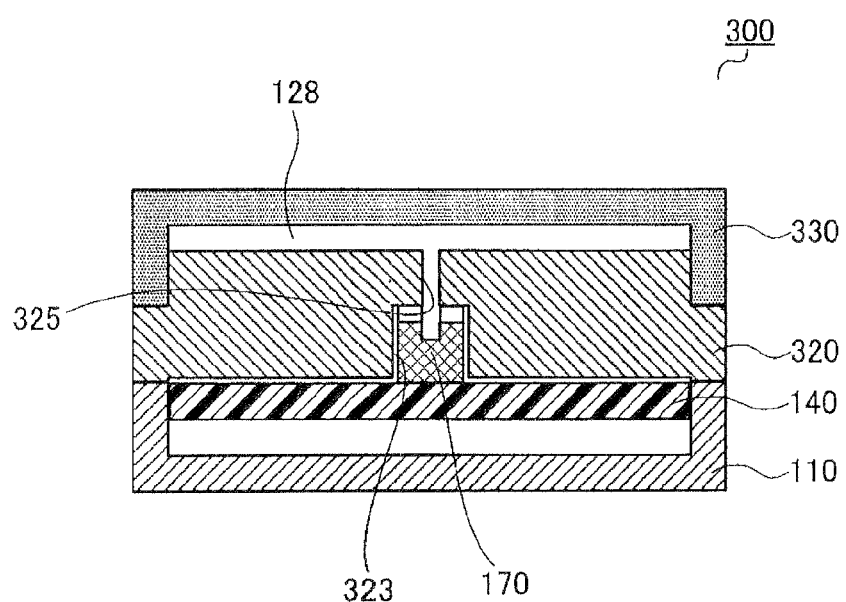
FIG. 12 is the C-C cross-sectional view indicated in FIG. 9.

FIG. 9 is a rear view showing the condition in which the battery cover of a mobile terminal apparatus according to Embodiment 3 of the present invention is mounted. FIG. 10 is the A-A cross-sectional view indicated in FIG. 9, FIG. 11 is the B-B cross-sectional view indicated in FIG. 9, and FIG. 12 is the C-C cross-sectional view indicated in FIG. 9. In describing the present embodiment, constituent parts that are the same as ones in FIG. 1 to FIG. 4 are assigned the same reference symbols and repeated descriptions thereof will be omitted.

As shown in FIG. 9 to FIG. 12, mobile terminal apparatus 300 has front surface casing 110, rear surface casing 320, battery cover 330, printed circuit board 140, speaker 150, camera 160, and microphone 170.

Rear surface casing 320 has formed therein aperture section 321 housing speaker 150 mounted to printed circuit board 140, aperture section 322 housing camera 160, and aperture section 323 housing microphone 170. Aperture sections 321, 322, and 323 have shapes that are substantially the same as the outer shapes of the corresponding components formed on the rear surface of rear surface casing 120, so that each of the components is housed therein without a gap.

Speaker sound hole 324 for speaker 150 communicating with speaker 150 and opening toward battery cover 130 side is formed in rear surface casing 320. Speaker sound hole 324, as shown in FIG. 9, is a rectangle which is long in the long direction of mobile terminal apparatus 300.

Sound hole 325 for microphone 170 is formed in rear surface casing 320. The bottom part of rear surface casing 320 has formed therein aperture section 326, directed toward the base surface. For this reason, gap 127 is formed between the lower part surface of rear surface casing 320 and the rear surface of battery cover 330, and gap 127 serves as a sound-collecting path from the base part of mobile terminal apparatus 300 to gap 127, and up to sound hole 125 and microphone 170.

Battery cover 330 has formed therein aperture section 332 having substantially the same shape as aperture section 322 of rear surface casing 320 housing camera 160, the position, shape, and size of aperture 332 corresponding to aperture section 322.

Battery cover sound hole 334 in communication with speaker sound hole 324 of rear surface casing 320 is formed on battery cover 330, battery cover sound hole 334 corresponding to rear surface casing 320 in position, shape, and size.

In this manner, mobile terminal apparatus 300 is configured so that battery cover 330 completely covers rear surface casing 320, and also so that speaker sound hole 324 of speaker 150 housed in rear surface casing 320 and microphone sound hole 325 of microphone 170 are disposed in the same direction. That is, in mobile terminal apparatus 300, the sound-emitting direction of speaker 150 and the sound-collecting direction of microphone 170 are disposed in the same direction.

Space 128 is formed between rear surface casing 320 and battery cover 330. When battery cover 330 covers the entire rear surface casing 320, space 128 becomes necessary because of the inconsistency in heights and housing space for the battery and various components, and the need to have leeway in opening and closing.

The features of the present embodiment with the above-noted configuration are as follows.

Recessed groove section 329 is formed in the periphery of speaker sound hole 324 of rear surface casing 320. Protruding section 339 to which groove section 329 is mated is formed in battery cover 330 at a position facing groove section 329.

That is, mobile terminal apparatus 300 of the present embodiment has the feature of recessed groove section 329 being formed in the periphery of speaker sound hole 324 on rear surface casing 320 and protruding section 339 with which groove section 329 mates being formed in battery cover 330.

In the present embodiment, groove section 329 is formed so as to surround the periphery of speaker sound hole 324. In the same manner, protruding section 339 that mates with groove section 329 is formed so as to mate with groove section 329. Groove section 329 and protruding section 339 are formed on at least one side on microphone 170 side.

Groove section 329 and protruding section 339 are provided at a location that is approximately 1 mm from the periphery of speaker sound hole 324. It is desirable that the depth of groove section 329 be 0.8 to 0.9 mm and that the width thereof be 0.4 to 0.7 mm.

The transmitting and receiving operation of mobile terminal apparatus 300 configured as noted above is described below.

The white arrows in FIG. 10 show the echo path over which sound propagates outside battery cover 330. The broken line arrows in FIG. 10 show the echo path in the case of sound propagating inside battery cover 330.

[Echo Path of Sound Propagating Outside Battery Cover 330]

The echo path of sound propagating outside battery cover 330 is the same as in Embodiment 1.

[Echo Path of Sound Propagating Inside Battery Cover 330]

As shown by the broken line arrows in FIG. 10, when a voice generated from speaker 150 passes through space 128 between rear surface casing 320 and battery cover 330, passes through sound hole 325 of microphone 170, and is picked up by microphone 170, echoes and howling that cause a deterioration of the call quality tend to occur.

In the present embodiment, because in the propagation path of sound passing through a space between rear surface casing 320 and battery cover 330, recessed groove section 329 is formed in the periphery of speaker sound hole 324 of rear surface casing 320 and also protruding section 339 that mates with groove section 329 of the battery cover 330 is provided. Thus, there is attenuation in the periphery of speaker sound hole 324. As a result, echoes from speaker 150 to microphone 170 can be reduced in the case of propagation inside battery cover 330, and the generation of echoes during a call can be suppressed. For the same reason, with respect to coupling by vibration so as to propagate in battery cover 330, the amount of displacement of battery cover 330 can be reduced, and echoes and howling occurring during a call can be suppressed.

In the present embodiment, because groove section 329 and protruding section 339 are provided in the periphery of speaker sound hole 324 close to the source of sound, sound and vibration are attenuated before they propagate to battery cover 330, and a greater effect of suppressing howling can be expected. Because there is no change of the shapes of rear surface casing 320 and battery cover 330 in the vicinity of microphone 170, there is the advantage that there is no design change in these parts.

(Embodiment 4)

Figure 13:
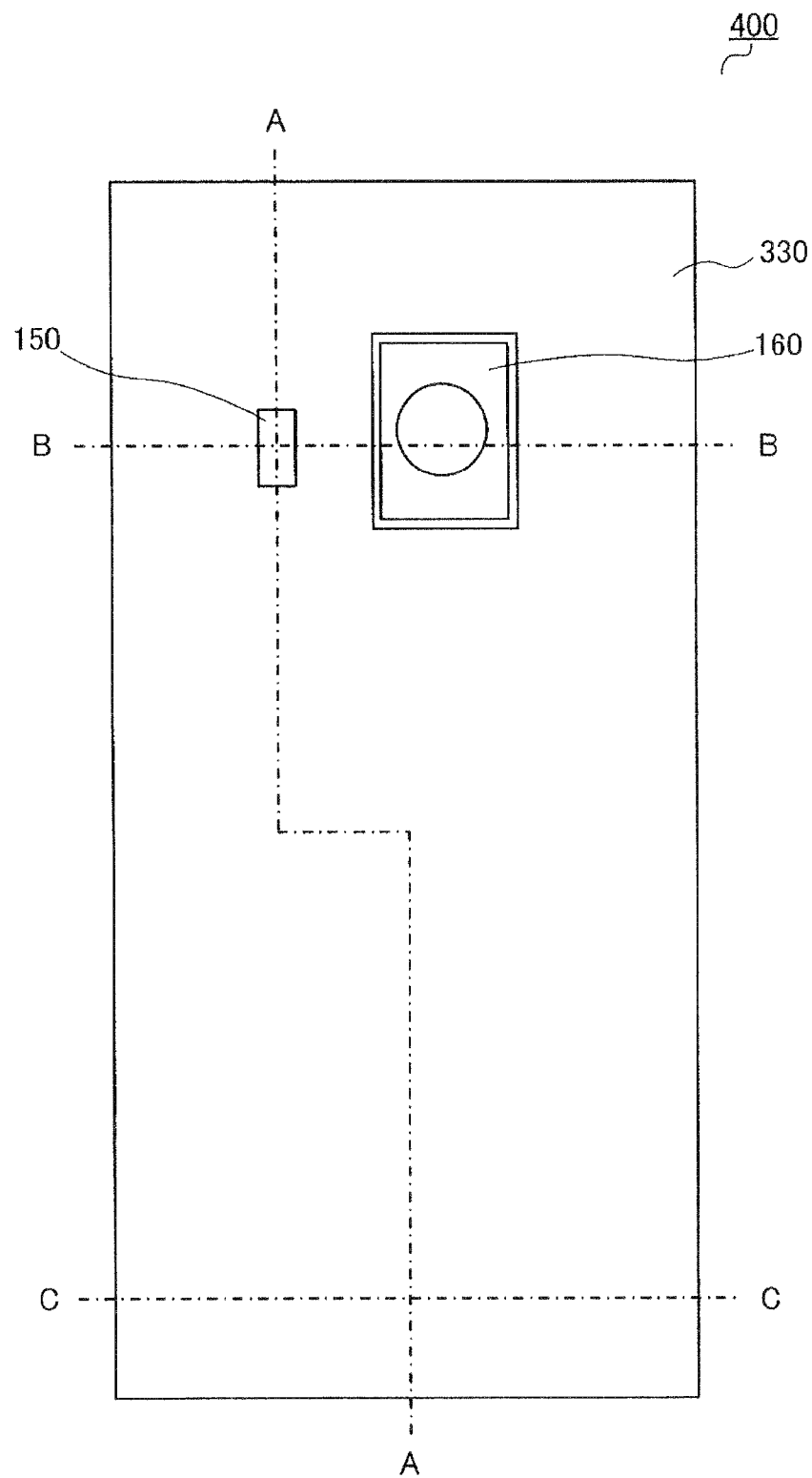
FIG. 13 is a rear view showing the condition in which the battery cover of the mobile terminal apparatus of Embodiment 4 of the present invention is mounted.
Figure 14:
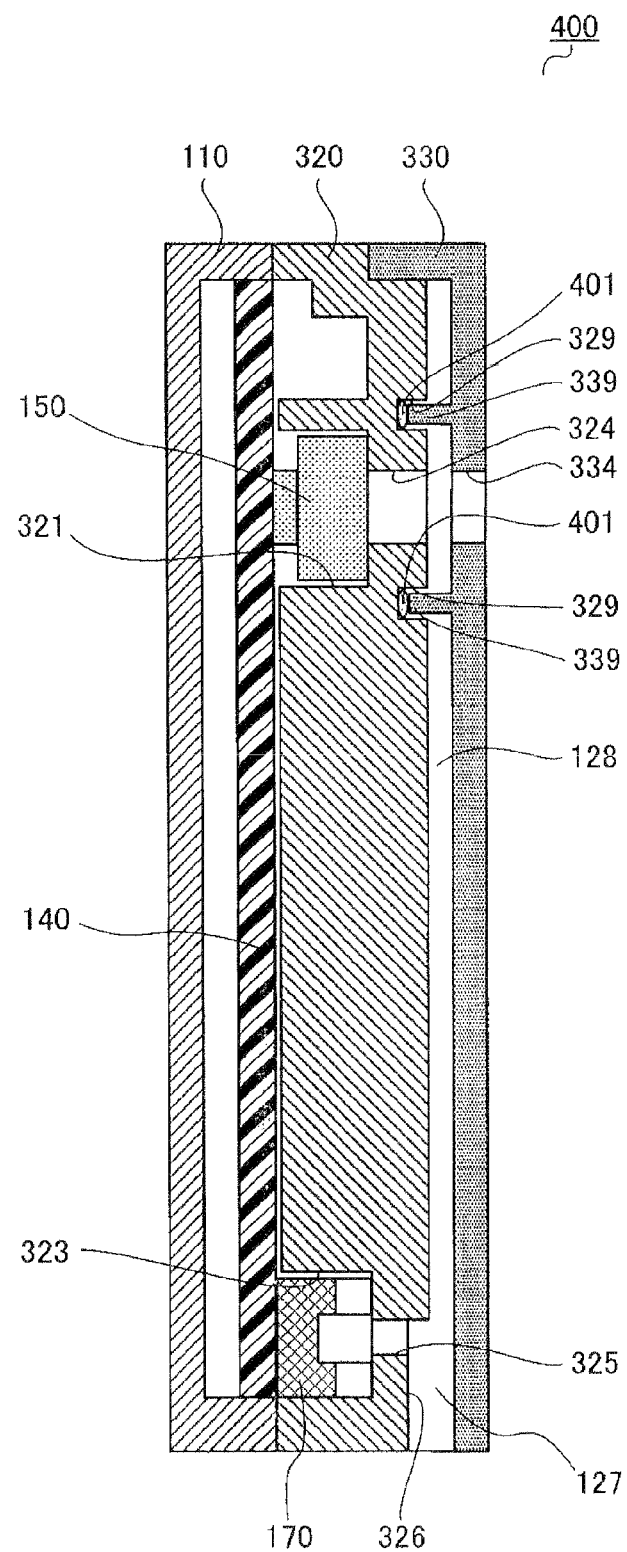
FIG. 14 is a cross-sectional view showing the general configuration of an electronic apparatus having the A-A cross-section indicated in FIG. 13.
Figure 15:
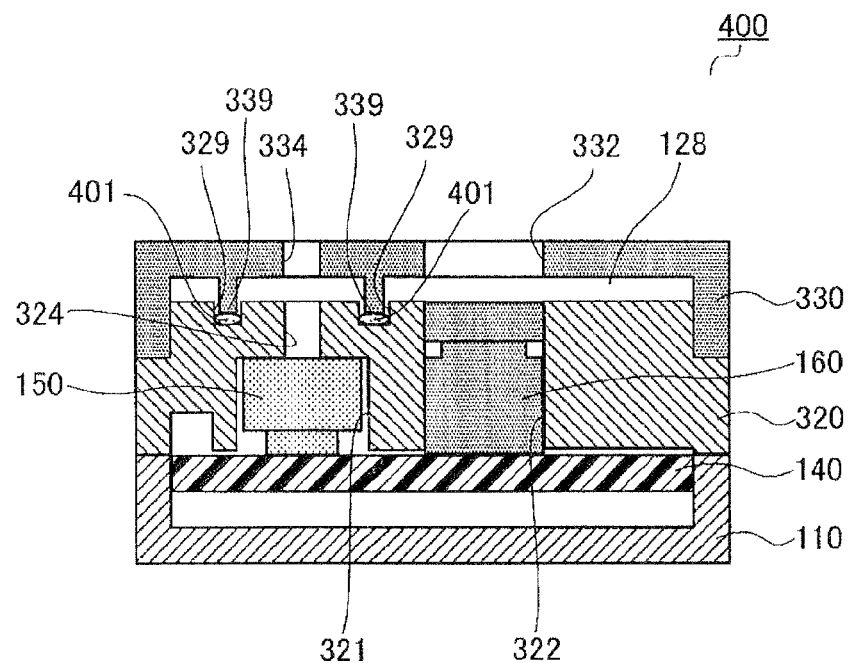
FIG. 15 is the B-B cross-sectional view indicated in FIG. 13.
Figure 16:
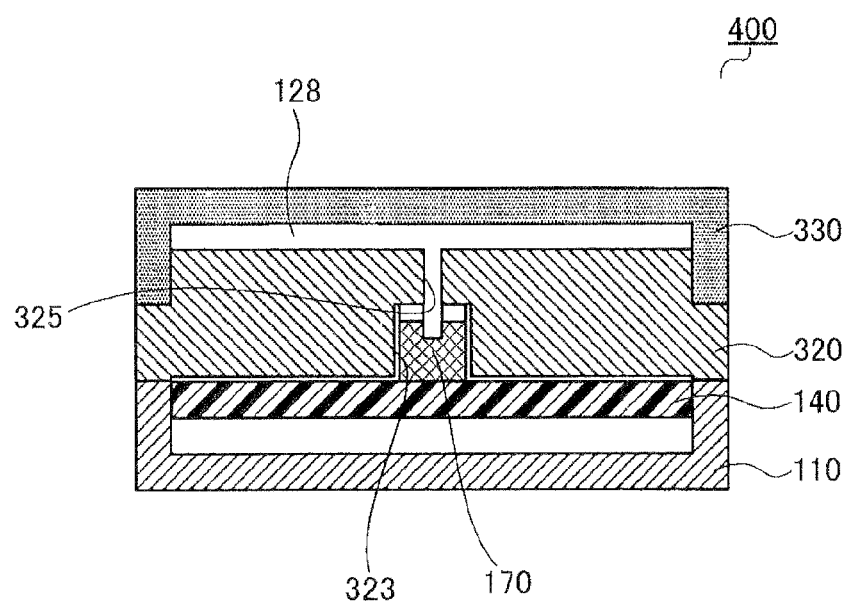
FIG. 16 is the C-C cross-sectional view indicated in FIG. 13.

FIG. 13 is a rear view showing the condition in which the battery cover of a mobile terminal apparatus according to Embodiment 4 of the present invention is mounted. FIG. 14 is the A-A cross-sectional view indicated in FIG. 13, FIG. 15 is the B-B cross-sectional view indicated in FIG. 13, and FIG. 16 is the C-C cross-sectional view indicated in FIG. 13. In describing the present embodiment, constituent parts that are the same as ones in FIG. 9 to FIG. 12 are assigned the same reference symbols and repeated descriptions thereof will be omitted.

As shown in FIG. 13 to FIG. 16, mobile terminal apparatus 400 has groove section 329 formed in the periphery of speaker sound hole 324 of the rear surface casing 320, protruding section 339 formed in battery cover 330 which mates with groove section 329, and elastic body 401 fit by insertion with groove section 329 and pressed by protruding section 339.

For elastic body 401, a polyurethane-based or polyolefin-based foam-based body, or a rubber-based material such as silicone rubber or elastomer resin can be used.

In this manner, in the present embodiment, by adopting a configuration in which, in mobile terminal apparatus 400, elastic body 401 is fitted by insertion into groove section 329 of rear surface casing 320 and is pressed from above by protruding section 339 of battery cover 330, elastic body 401 absorbs echoes and howling, enabling further improvement of the echo suppression effect.

(Embodiment 5)

Figure 17:
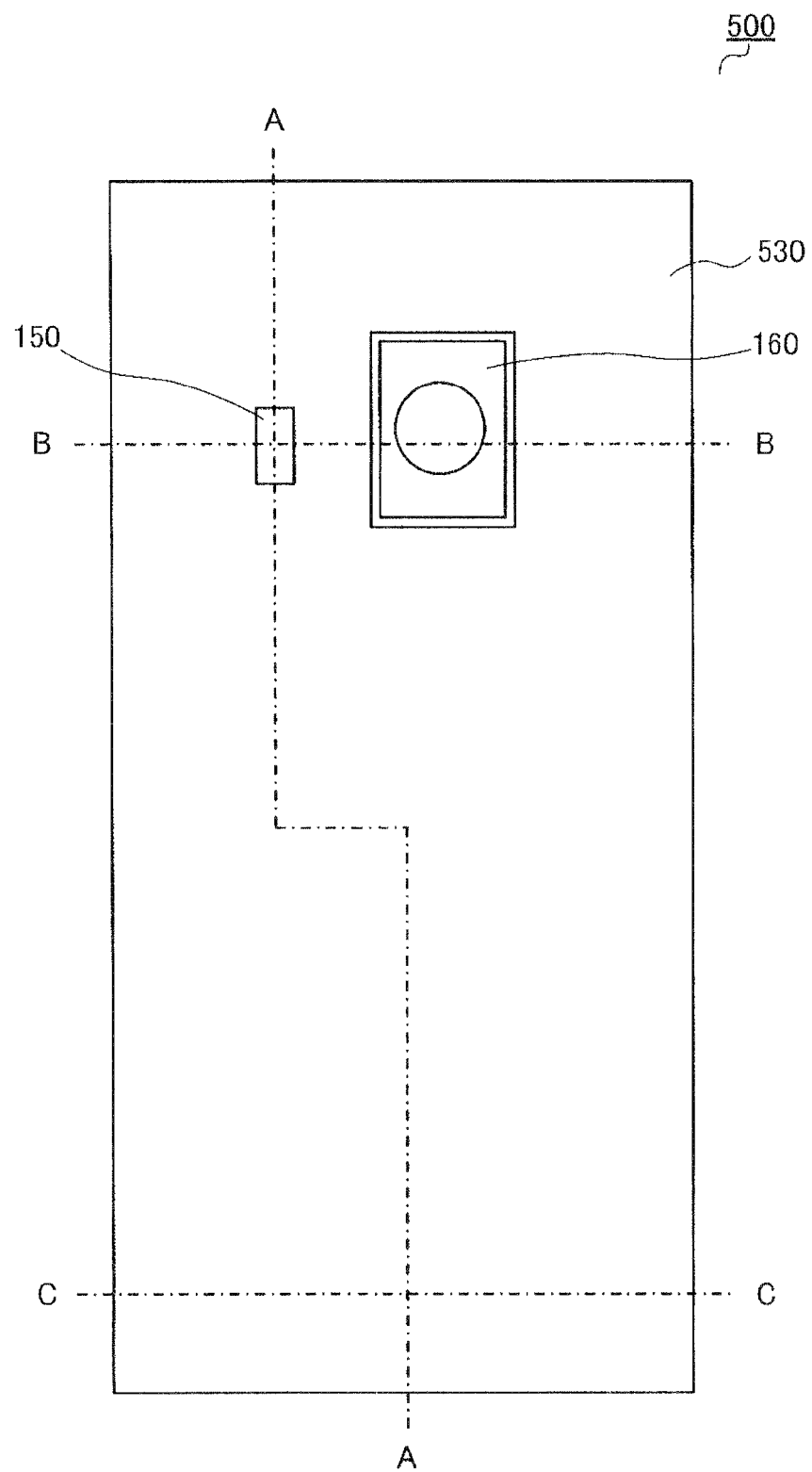
FIG. 17 is a rear view showing the condition in which the battery cover of the mobile terminal apparatus of Embodiment 5 of the present invention is mounted.
Figure 18:
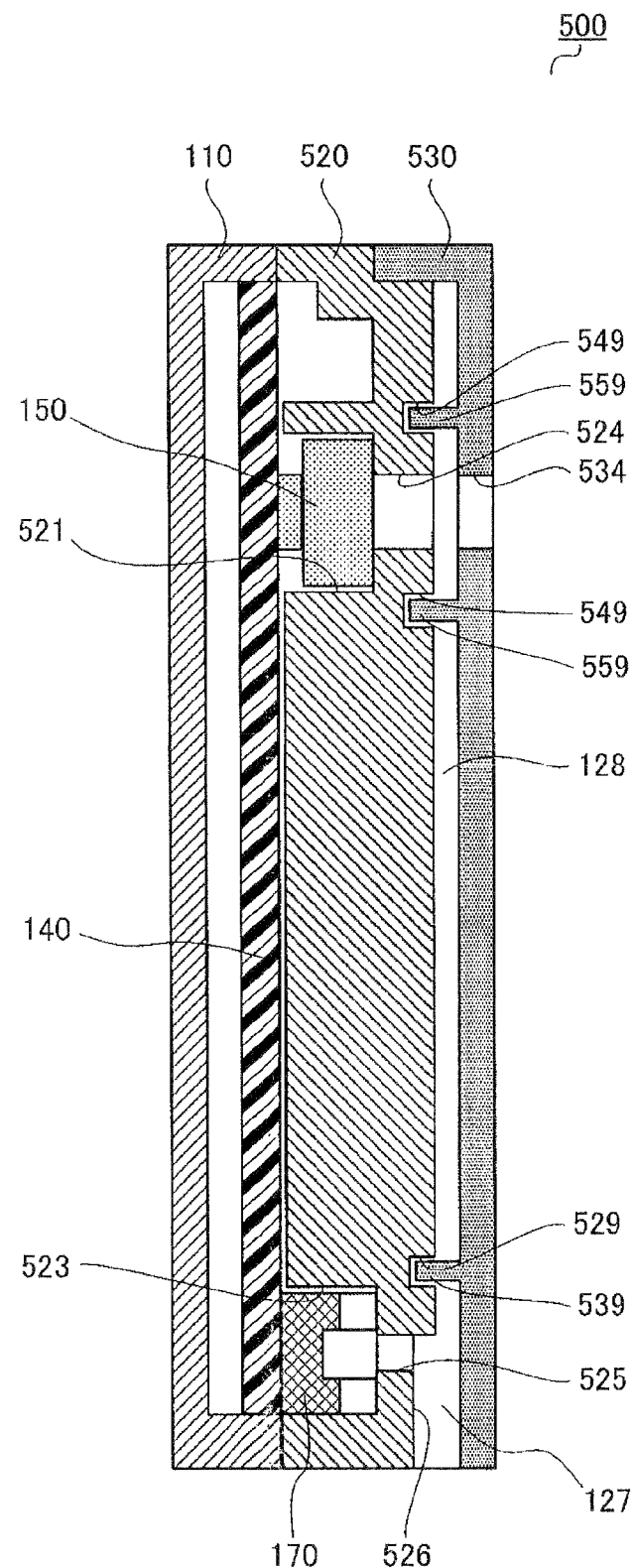
FIG. 18 is a cross-sectional view showing the general configuration of an electronic apparatus having the A-A cross-section indicated in FIG. 17.
Figure 19:
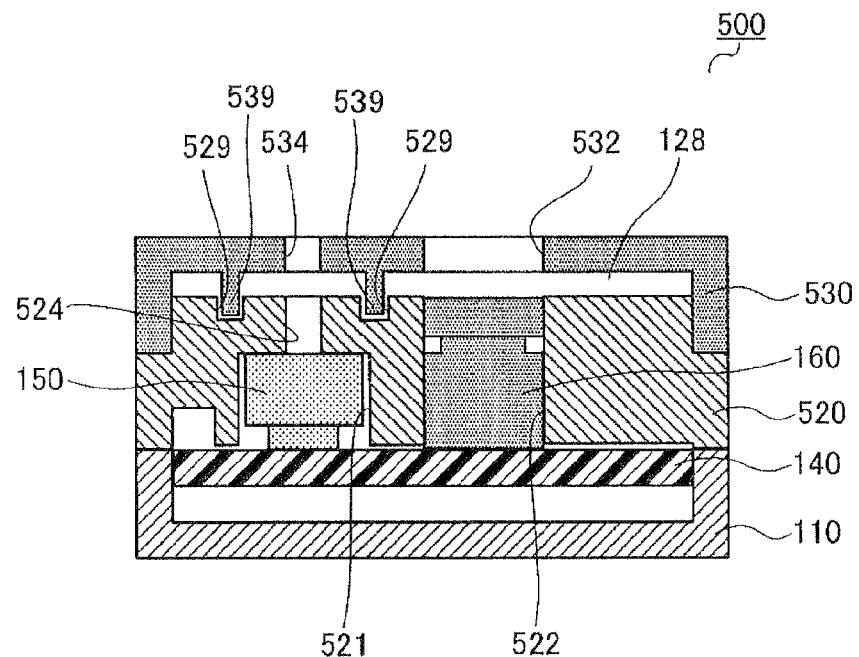
FIG. 19 is the B-B cross-sectional view indicated in FIG. 17.
Figure 20:
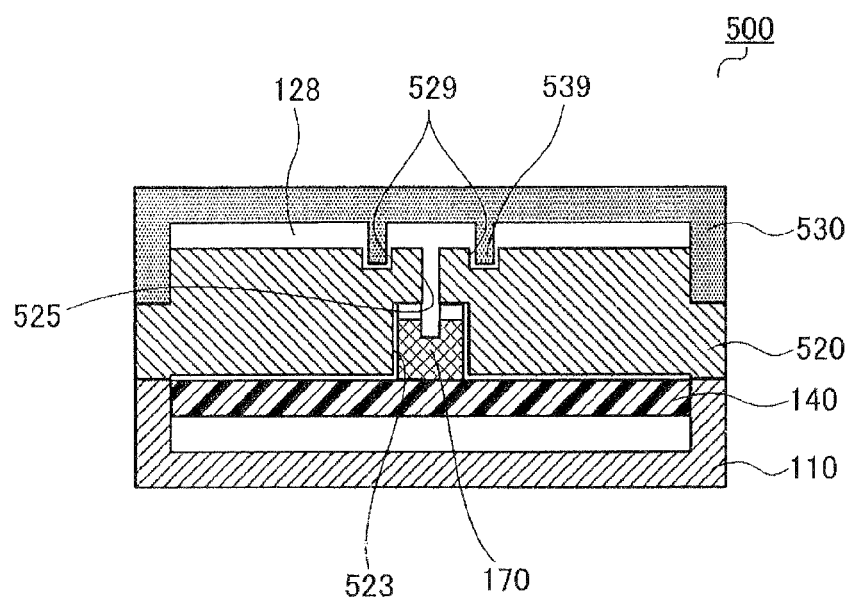
FIG. 20 is the C-C cross-sectional view indicated in FIG. 17.

FIG. 17 is a rear view showing the condition in which the battery cover of a mobile terminal apparatus according to Embodiment 5 of the present invention is mounted. FIG. 18 is the A-A cross-sectional view indicated in FIG. 17, FIG. 19 is the B-B cross-sectional view indicated in FIG. 17, and FIG. 20 is the C-C cross-sectional view indicated in FIG. 17. In describing the present embodiment, constituent parts that are the same as ones in FIG. 1 to FIG. 16 are assigned the same reference symbols and repeated descriptions thereof will be omitted.

As shown in FIG. 17 to FIG. 20, mobile terminal apparatus 500 has rear surface casing 110, rear surface casing 520, battery cover 530, printed circuit board 140, speaker 150, camera 160, and microphone 170.

Rear surface casing 320 has formed therein aperture section 521 housing speaker 150 mounted to printed circuit board 140, aperture section 522 housing camera 160, and aperture 523 housing microphone 170. Aperture sections 521, 522, and 523 have shapes that are substantially the same as the outer shapes of the corresponding components formed on the rear surface of rear surface casing 520, so that each of the components is housed therein without a gap.

Speaker sound hole 524 for speaker 150 in communication with speaker 150 and opening toward battery cover 130 side is formed in rear surface casing 520. Speaker sound hole 524, as shown in FIG. 17, is a rectangle which is long in the long direction of mobile terminal apparatus 500.

Sound hole 525 for microphone 170 is formed in rear surface casing 520. The bottom part of rear surface casing 520 has formed therein aperture section 526, directed toward the base surface. For this reason, gap 127 is formed between the lower part surface of rear surface casing 520 and the rear surface of battery 530, and gap 127 serves as a sound collection path from the base part of mobile terminal apparatus 500 to gap 127, and up to sound hole 525 and microphone 170.

Battery cover 530 has formed therein an aperture section 532 having substantially the same shape as aperture section 522 of rear surface casing 520 housing camera 160, the position, shape, and size of aperture 532 corresponding to aperture section 522.

Battery cover sound hole 534 communicating with speaker sound hole 524 of the rear surface casing is formed on battery cover 530, battery cover sound hole 534 corresponding to rear surface casing 520 in position, shape, and size.

In this mariner, mobile terminal apparatus 500 is configured so that battery cover 530 completely covers rear surface casing 520, and also so that speaker sound hole 524 of speaker 150 housed in rear surface casing 520 and microphone sound hole 525 of microphone 170 are set in the same direction. That is, in mobile terminal apparatus 500, the sound-emitting direction of speaker 150 and the sound-collecting direction of microphone 170 are disposed in the same direction.

Space 128 is formed between rear surface casing 520 and battery cover 530. When battery cover 530 covers the entire rear surface casing 520, space 128 becomes necessary because of the inconsistency in heights and housing space for the battery and various components, and the need to have leeway in opening and closing.

The features of the present embodiment with the above-noted configuration are as follows.

The present embodiment is a combination of Embodiment 1 and Embodiment 3.

Recessed groove section 529 is formed in the periphery of microphone sound hole 525 of rear surface casing 520. Protruding section 539 to which groove section 529 mates is formed in battery cover 530 at a position facing groove section 529.

Additionally, recessed groove section 549 is formed in the periphery of speaker sound hole 524 on rear surface casing 520. Protruding section 559 to which groove section 549 mates is formed in battery cover 530 at a position facing groove section 549.

It is therefore possible to obtain an effect of the combination of Embodiment 1 and Embodiment 3, thereby even further suppressing echoes and howling during a call.

There is additionally the following synergy effect.

Because the occurrence of echoes and howling is reduced by groove section 529 and protruding section 539 in the periphery of microphone sound hole 525, it is possible to further reduce the protruding and recessed shapes of groove section B49 and protruding section 559 provided for the same purpose in the periphery of speaker 150. This reduction is the making of the depth of the recessed section shallow, the width of the recessed section narrow, and the number of sides on which speaker 150 is surrounded smaller. In the same manner, it is possible by the recessed and protruding shapes of groove section 549 and protruding section 559 in the periphery of speaker sound hole 524, to reduce the recessed and protruding shapes of groove section 529 and protruding section 539 in the periphery of microphone sound hole 525.

Figure 21:
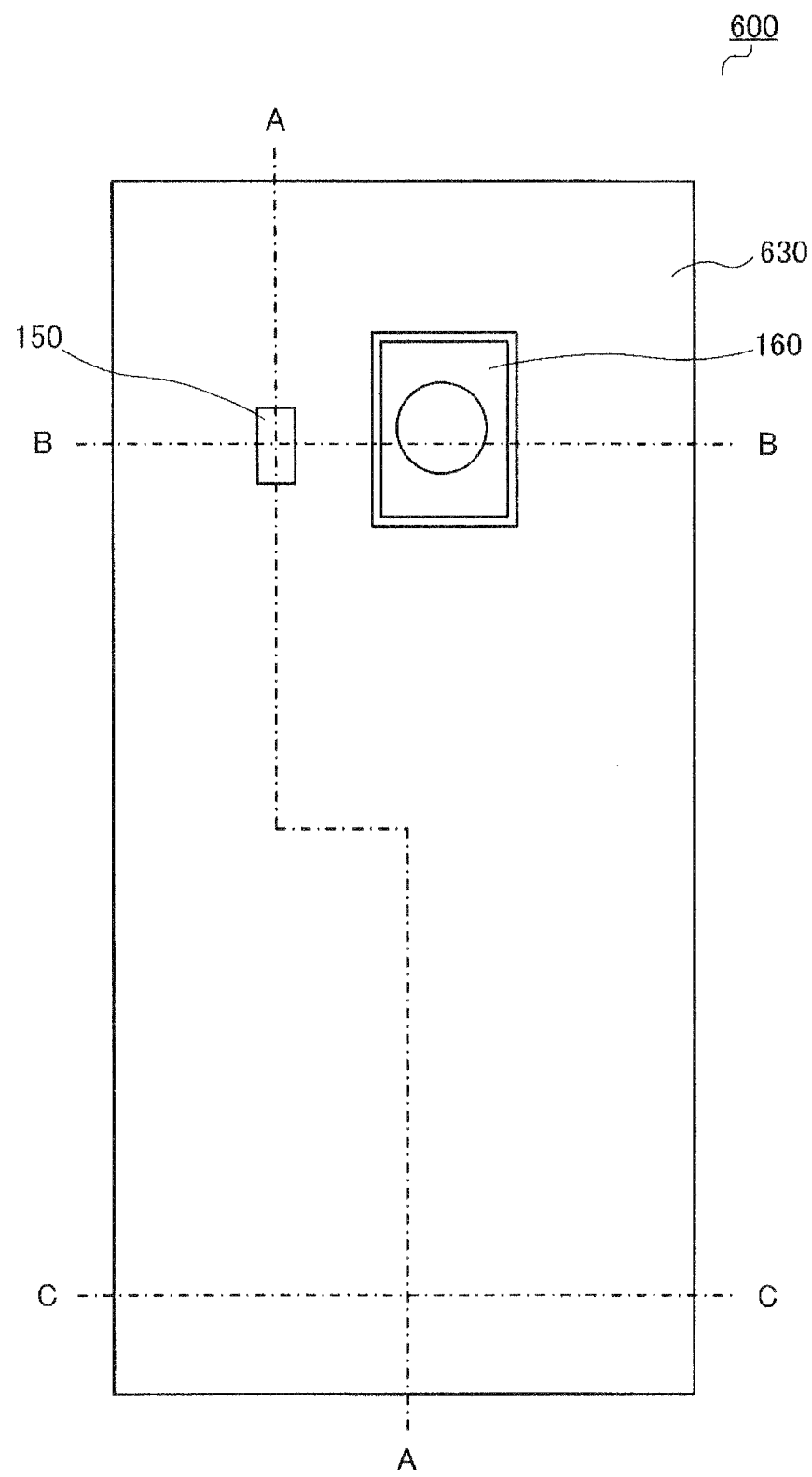
FIG. 21 is a rear view showing the condition in which the battery cover of the mobile terminal apparatus of Embodiment 6 of the present invention is mounted.
Figure 22:
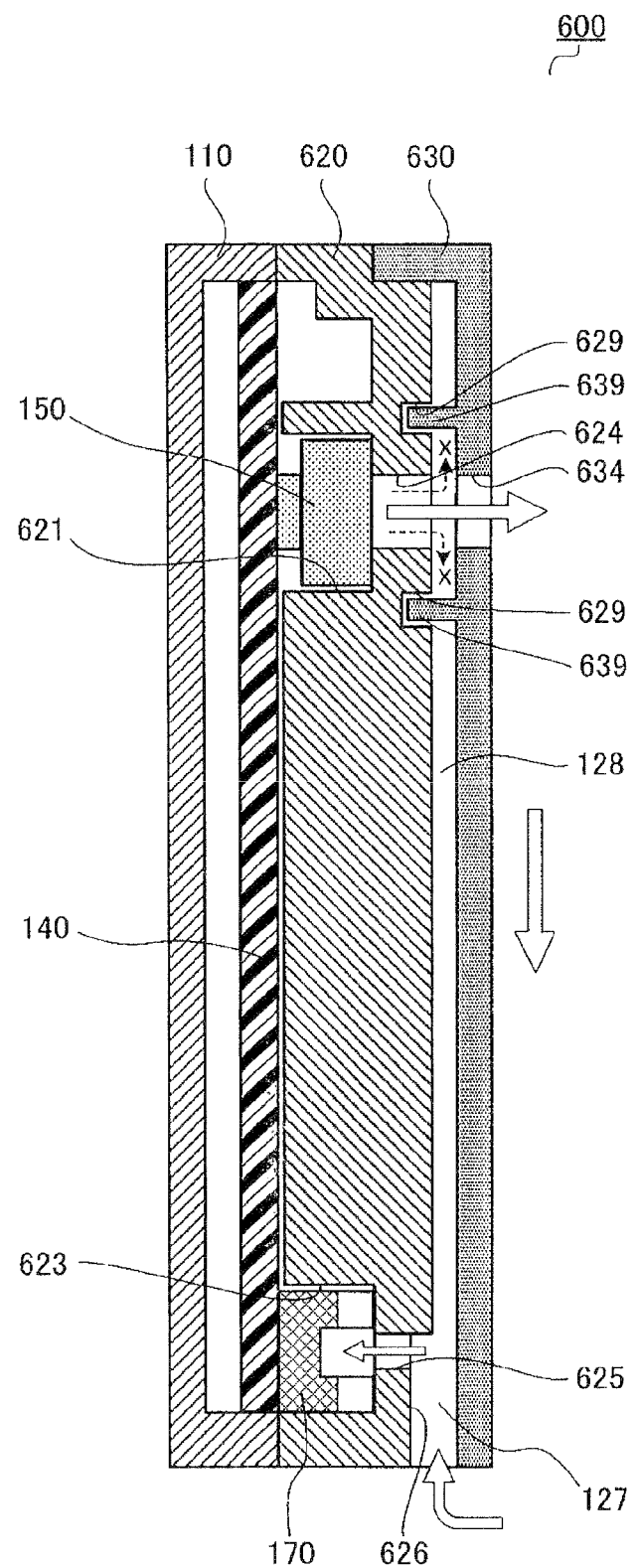
FIG. 22 is a cross-sectional view showing the general configuration of an electronic apparatus having the A-A cross-section indicated in FIG. 21.
Figure 23:
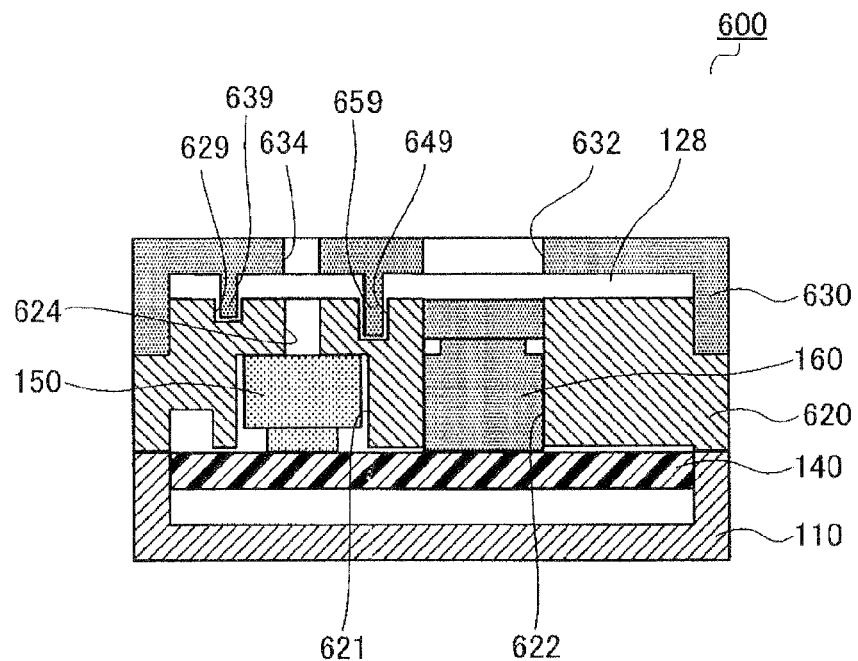
FIG. 23 is the B-B cross-sectional view indicated in FIG. 21.
Figure 24:
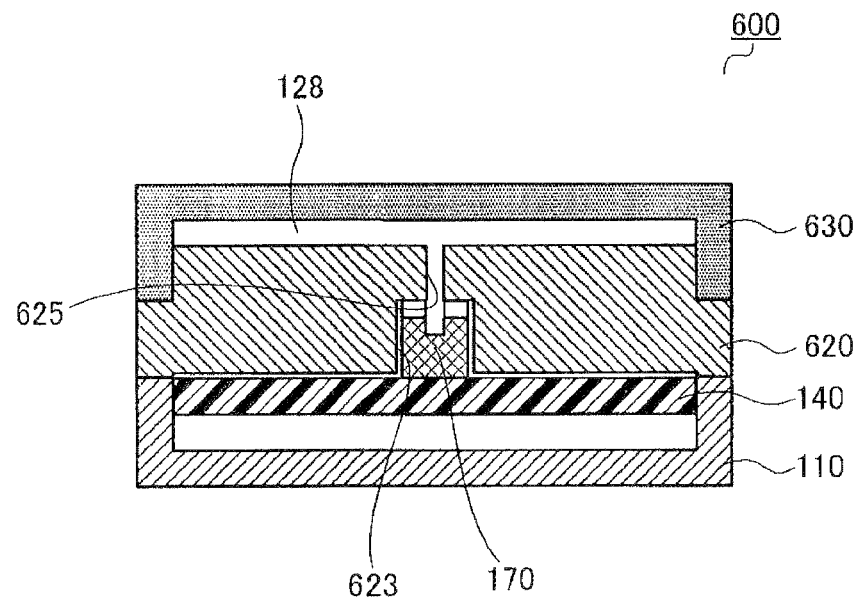
FIG. 24 is the C-C cross-sectional view indicated in FIG. 21.

FIG. 21 is a rear view showing the condition in which the battery cover of a mobile terminal apparatus according to Embodiment 6 of the present invention is mounted. FIG. 22 is the A-A cross-sectional view indicated in FIG. 21, FIG. 23 is the B-B cross-sectional view indicated in FIG. 21, and FIG. 24 is the C-C cross-sectional view indicated in FIG. 21. In describing the present embodiment, constituent parts that are the same as ones in FIG. 9 to FIG. 12 are assigned the same reference symbols and repeated descriptions thereof will be omitted.

As shown in FIG. 21 to FIG. 24, mobile terminal apparatus 600 has front surface casing 110, rear surface casing 620, battery cover 630, printed circuit hoard 140, speaker 150, camera 160, and microphone 170.

Rear surface casing 620 has formed therein aperture section 621 housing speaker 150 mounted to printed circuit board 140, aperture section 622 housing camera 160, and aperture section 623 housing microphone 170. Aperture sections 621, 622, and 623 have shapes that are substantially the same as the outer shapes of the corresponding components formed on the rear surface of rear surface casing 620, so that each of the components is housed therein without a gap.

Speaker sound hole 624 for speaker 150 in communication with speaker 150 and opening toward battery cover 630 side is formed in rear surface casing 620. Speaker sound hole 624, as shown in FIG. 21, is a rectangle which is long in the long direction of mobile terminal apparatus 600.

Sound hole 625 for microphone 170 is formed in rear surface casing 620. The bottom part of rear surface casing 620 has formed therein aperture section 626, directed toward the base surface. For this reason, gap 127 is formed between the lower part surface of rear surface casing 620 and the rear surface of battery cover 630, and gap 127 serves as a sound-collecting path from the base part of mobile terminal apparatus 600 to gap 127, and up to sound hole 625 and microphone 170.

Battery cover 630 has formed therein aperture section 632 having substantially the same shape as aperture section 622 of rear surface casing 620 housing camera 160, the position, shape, and size of aperture 632 corresponding to aperture section 622.

Battery cover sound hole 634 in communication with speaker sound hole 624 of rear surface casing 620 is formed on battery cover 630, battery cover sound hole 634 corresponding to rear surface casing 620 in position, shape, and size.

In this manner, mobile terminal apparatus 600 is configured so that battery cover 630 completely covers rear surface casing 620, and also so that speaker sound hole 624 of speaker 150 housed in rear surface casing 620 and microphone sound hole 625 of microphone 170 are disposed in the same direction. That is, in mobile terminal apparatus 600, the sound-emitting direction of speaker 150 and the sound-collecting direction of microphone 170 are set in the same direction.

Space 128 is formed between rear surface casing 620 and battery cover 630. When battery cover 630 covers the entire rear surface casing 620, space 128 becomes necessary because of the inconsistency in heights and housing space for the battery and various components, and the need to have leeway in opening and closing.

The features of the present embodiment with the above-noted configuration are as follows.

As shown in FIG. 23, in rear surface casing 620, first recessed groove section 639 is formed in the periphery of speaker sound hole 624 other than the camera 160 side, and second recessed groove section 649 is formed in the periphery of speaker sound hole 624 on camera 160 side, Also, in battery cover 630, first protruding section 639 with which first groove section 629 mates is formed at a position facing first groove section 629, and second protruding section 659 with which second groove section 649 mates is formed at a position thereon facing second groove section 649.

That is, mobile terminal apparatus 600 features the formation, in rear surface casing 620, of first groove section 629 and second groove sections 649 in the periphery of speaker sound hole 624 other than camera 160 side, and the formation, in battery cover 630, of first protruding section 639 and second protruding section 659 that mate with first groove section 629 and second groove section 649.

In the present embodiment, second groove section 649 adjacent to the camera 160 side has a deeper depression than first groove section 629 outside of the camera 160 side. Accompanying this, second protruding section 659 that mates with second groove section 649 has a protruding part that is longer than first production section 639 that mates with first groove section 629. Therefore, on the side of the aperture adjacent to speaker sound hole 624 of speaker 150 (in this case, aperture section 622 housing camera 160), speaker sound hole 624 is blocked more effectively than from other surrounding sides.

In this manner, in the present embodiment, even if there is, with respect to the sound-emitting direction of speaker sound hole 624, aperture section 632 other than speaker sound hole 624, is possible to suppress deterioration of volume and distortion, enabling the establishment of good acoustic performance.

In particular, because second groove section 649 on the side of camera 160 has a depressed part that is deeper than that of first groove section 629 other than the side of camera 160, it is possible to reduce the influence of aperture section 632 other than speaker sound hole 624, and possible to suppress deterioration of volume and distortion. As a result, it is possible to establish good acoustic performance.

In the present embodiment, although the description has been for an example in which an aperture section 622 of camera 160 is an aperture section adjacent to speaker sound hole 624, as long as it is an aperture section adjacent to speaker sound hole 624, it may be any type of aperture section, one example being an aperture section for an LED.

Also, although the description of the present embodiment has been for an example in which the method for more effectively blocking an aperture section adjacent to speaker sound hole 624 was to make the groove section deep, the width of the groove section may be made large, it may be formed in steps, or a combination of these may be used. Additionally, an elastic body such as in Embodiment 4 may be fitted by insertion.

Although the present invention has been demonstrated by examples of embodiments, the scope of the present invention is not restricted thereto.

In the above-noted embodiments, although the description was for application to a mobile telephone handset as the mobile terminal apparatus, there is no restriction to a mobile telephone handset, and application is possible to a mobile data apparatus such as a PDA, an apparatus such as a personal computer, or a combination thereof, and further to mobile equipment such as MP3 players, hard-disk drive players, and the like.

In the above embodiments, although names such as mobile terminal apparatus and mobile telephone handset were used, these are merely conveniences, and it will be readily apparent that they can be mobile terminal, echo suppression structure, and electronic device or the like.

Additionally, the type, materials of, shape of, and mounting method of the various constituent elements of the above-noted mobile terminal apparatus can be of any type. Although a battery cover generally has a slide stop, this is not a restriction.

The disclosure of Japanese Patent Application No. 2011-059390, filed on Mar. 17, 2011, including the specification, drawings and abstract, is incorporated herein by reference in its entirety.

INDUSTRIAL APPLICABILITY

The mobile terminal apparatus according to the present invention that suppresses echoes and howling and that achieves good call performance can be provided as a mobile terminal apparatus and also can be incorporated as a mobile terminal apparatus into various electronic equipment other than a mobile terminal apparatus.

REFERENCE SIGNS LIST 100, 200, 300, 400, 500, 600 Mobile terminal apparatus
110 Front surface casing
120, 320, 420, 520, 620 Rear surface casing
124, 324, 524, 624 Speaker sound hole
125, 325, 525, 625 Sound hole
129, 329, 529 Groove section
130, 330, 430, 530, 630 Battery cover
139, 339, 539 Protruding section
140 Printed circuit board
150 Speaker
160 Camera
170 Microphone
201, 401 Elastic body
629 First groove section
639 First protruding section
649 Second groove section
659 Second protruding section

The invention claimed is:

1. A mobile terminal apparatus comprising:
a casing that houses a microphone and a speaker; and
a cover that is configured to be removably attachable to the casing and that covers a rear surface of the casing that includes an input section of the microphone and an output section of the speaker, wherein:
the cover includes a gap between the cover and the casing when the cover is attached to the casing;
the rear surface of the casing includes a recessed section that intersects with a straight line connecting the input section of the microphone and the output section of the speaker;
the cover includes a protruding section that mates with the recessed section to block the gap; and
the cover is attachable to the casing by moving the cover in the same direction as the mating direction between the recessed section and the protruding section.

2. The mobile terminal apparatus according to claim 1, wherein:
the cover includes an outwardly extending section in a peripheral edge of the cover, the outwardly extending section extending toward the casing side; and
the cover is attached to the casing by the outwardly extending section being fitted over a rear peripheral edge of the casing.

3. The mobile terminal apparatus according to claim 1, wherein:
the casing includes an elastic body buried in the recessed section; and
when the casing is attached to the cover, the protruding section is mated with the recessed section while pressing on the elastic body.

4. The mobile terminal apparatus according to claim 1, wherein the cover is a battery cover that covers a battery.

5. A mobile terminal apparatus comprising:
a casing that houses a microphone and a speaker and that includes a sound hole for the microphone and a sound hole for the speaker, the sound holes being formed in the same direction;
a cover that is configured to be removably attachable to the casing and that covers a rear surface of the casing that includes the sound hole of the microphone and the sound hole of the speaker, wherein:
the cover includes a gap between the sound hole of the microphone and the sound hole of the speaker when the cover is attached to the casing;
the rear surface of the casing includes a recessed section that intersects at least with a straight line connecting the sound hole of the microphone and the sound hole of the speaker;
the cover includes a protruding section that mates with the recessed section to block the gap; and
the cover is attachable to the casing by moving the cover in the same direction as the mating direction between the recessed section and the protruding section.

6. The mobile terminal apparatus according to claim 5, wherein:
in an edge section on a side in which the sound hole of the microphone is present, an aperture in communication with the outside is formed by a gap between the cover and the rear surface of the casing; and
the recessed section and the protruding section are formed on three sides in a periphery of the microphone sound hole, excluding the end section side of the casing, and a path from the aperture to the microphone sound hole and up to the microphone serves as a sound-collecting path.

7. The mobile terminal apparatus according to claim 5, wherein the recessed section is formed so as to surround the sound hole of the speaker.

8. The mobile terminal apparatus according to claim 5, wherein:
the cover includes an outwardly extending section in a peripheral edge of the cover, the outwardly extending section extending toward the casing side; and
the cover is attached to the casing by the outwardly extending section being fitted over a rear peripheral edge of the casing.

9. The mobile terminal apparatus according to claim 5, wherein:
the casing includes an elastic body buried in the recessed section; and
when the casing is attached to the cover, the protruding section is mated with the recessed section while pressing on the elastic body.

10. The mobile terminal apparatus according to claim 5, wherein the cover is a battery cover that covers a battery.

* * * * *